US010362609B2

(12) United States Patent
Perng et al.

(10) Patent No.: US 10,362,609 B2
(45) Date of Patent: Jul. 23, 2019

(54) METHODS AND SYSTEMS FOR AUTOMATICALLY PAIRING A PERSONAL ELECTRONIC DEVICE ON A TRANSPORTATION VEHICLE

(71) Applicant: Panasonic Avionics Corporation, Lake Forest, CA (US)

(72) Inventors: Bruce Perng, San Diego, CA (US); Gurmukh Khabrani, Irvine, CA (US); Mark Law, Lake Forest, CA (US); Chin Perng, San Diego, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 101 days.

(21) Appl. No.: 15/233,178

(22) Filed: Aug. 10, 2016

(65) Prior Publication Data

US 2018/0049250 A1 Feb. 15, 2018

(51) Int. Cl.

*H04W 76/10* (2018.01)
*H04L 29/08* (2006.01)
*B64D 11/00* (2006.01)
*H04W 4/48* (2018.01)

(52) U.S. Cl.

CPC ....... *H04W 76/10* (2018.02); *B64D 11/00155* (2014.12); *H04L 67/12* (2013.01); *H04L 67/125* (2013.01); *H04L 67/34* (2013.01); *H04W 4/48* (2018.02)

(58) Field of Classification Search

CPC . B64D 11/00155; H04L 67/12; H04L 67/125; H04L 67/34; H04W 4/48; H04W 76/10

See application file for complete search history.

(56) References Cited

U.S. PATENT DOCUMENTS

| | | | | |
|---|---|---|---|---|
| 8,650,636 B2 | 2/2014 | Johnson et al. | | |
| 8,806,521 B2 | 8/2014 | Keen et al. | | |
| 8,856,838 B2 | 10/2014 | Keen et al. | | |
| 9,003,454 B2 | 4/2015 | Keen et al. | | |
| 2007/0277224 A1 | 11/2007 | Osborn et al. | | |
| 2013/0005336 A1* | 1/2013 | Ayotte | H04W 12/06 | 455/435.1 |
| 2014/0242910 A1* | 8/2014 | Umlauft | H04W 4/008 | 455/41.1 |
| 2014/0282684 A1* | 9/2014 | Keen | H04N 21/2146 | 725/30 |

(Continued)

OTHER PUBLICATIONS

U.S. Appl. No. 14/693,541, filed Apr. 22, 2015.

*Primary Examiner* — Khaled M Kassim

(74) *Attorney, Agent, or Firm* — Klein, O'Neill & Singh, LLP

(57) ABSTRACT

Methods and systems for a transportation vehicle are provided. For example, one method includes requesting a network connection by an electronic device to a network on a transportation vehicle; transmitting passenger information by the electronic device to a transportation vehicle computing device, after the network connection is established; verifying passenger information by the transportation vehicle computing device; requesting confirmation of passenger information by the transportation vehicle computing device; and enabling communication from the electronic device to a system of the transportation vehicle for managing one or more seat control functions.

20 Claims, 7 Drawing Sheets

Content from Aircraft 128
Satellite Communication System 122
Viewing Content 124
Content to Aircraft 120
132
Content Source 113
Antenna System 110
Media Server System 112
Transceiver System 108
Computer System 106
User Interface System 114
User Interface System 114
User Interface System 114
124 138 140 106
Content Distribution System 104
Terrestrial Content Source 116
Internet 118
136
Access Point 130
Access Point 130
Access Point 130
100A

(56) References Cited

U.S. PATENT DOCUMENTS

| | | | | |
|---|---|---|---|---|
| 2015/0210287 | A1* | 7/2015 | Penilla | B60W 40/08<br>701/49 |
| 2016/0304207 | A1* | 10/2016 | Carles | B64D 11/0015 |
| 2017/0032159 | A1* | 2/2017 | Troy | G01S 5/02 |
| 2017/0182957 | A1* | 6/2017 | Watson | B60N 2/90 |
| 2017/0344974 | A1* | 11/2017 | Britt | H04W 4/70 |
| 2018/0024725 | A1* | 1/2018 | Penilla | B60W 40/08 |
| 2018/0059913 | A1* | 3/2018 | Penilla | G07C 5/008 |

* cited by examiner

METHODS AND SYSTEMS FOR AUTOMATICALLY PAIRING A PERSONAL ELECTRONIC DEVICE ON A TRANSPORTATION VEHICLE

TECHNICAL FIELD

The present disclosure relates to pairing a personal electronic device with a transportation vehicle system in general and more particularly, to automatically pairing a personal electronic device with a seat device of a transportation vehicle system.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by the passenger, such as adjustable seats, adjustable environmental controls, adjustable lighting, telephony systems, video and/or audio entertainment systems, crew communication systems, and the like. Many commercial airplanes today have individualized video and audio entertainment systems, often referred to as “inflight entertainment” or “IFE” systems. Such systems may also be referred to as “inflight entertainment and communication” systems as well, and typically abbreviated as “IFEC” systems.

As one example of a passenger seat function, the entertainment systems for passenger carrier vehicles, such as commercial airlines, often have video displays installed at each passenger seat. For instance, video displays may be provided at each passenger seat, such as mounted at each of the seats of the passenger seats, and/or on cabin walls and/or deployable from an armrest for seats located at a bulkhead, i.e., in the first row of a section. Many of these systems allow each passenger to select from multiple video channels and/or audio channels, or even individually select and play videos from a library of videos. These video displays may also provide access to games, communication applications (e.g., telephone service, messaging, etc.), Internet browsing, and other computer applications. Sometimes such displays are referred to as smart monitors due to the ability to provide computer applications and process and store data internally.

To operate the seat functions, such as an individualized audio/video system, controls are provided on or near the passenger seat that allow the passenger to control the seat functions. The controls may be physical buttons, or on-screen interfaces displayed, for instance, on the video display of the entertainment system. For example, some commercial airplane entertainment systems have on-screen interfaces for controlling a reading light, activating a crew member call signal, as well as controlling the audio/video entertainment.

It has become quite commonplace for travelers to carry personal electronic devices having wireless communication capability, such as cellular phones, smart phones, tablet computers, laptop computers, and other portable electronic devices. This includes passengers traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs (“apps”) to perform various functions, including controlling other devices and systems. Continuous efforts are being made to automatically pair passenger electronic devices to passenger seats and the functions provided therein, with minimal passenger involvement.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms “component”, “module”, “system”, and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Methods and systems for a transportation vehicle are provided. For example, one method includes requesting a network connection by an electronic device to a network at a transportation vehicle; transmitting passenger information by the electronic device to a transportation vehicle computing device, after the network connection is established; verifying passenger information by the transportation vehicle computing device; requesting confirmation of passenger information by the transportation vehicle computing device; and enabling communication from the electronic device to a system of the transportation vehicle for managing one or more seat control functions.

In another aspect, a method includes establishing a wireless network connection for an electronic device to a network of an aircraft; transmitting passenger information by the electronic device to an onboard management system; verifying passenger information against passenger manifest data stored by the onboard management system; requesting confirmation of a passenger seat location by the onboard management system; and upon successful confirmation of the passenger seat location, enabling communication from the electronic device to an aircraft system for managing one or more seat control functions.

Figure 1A:
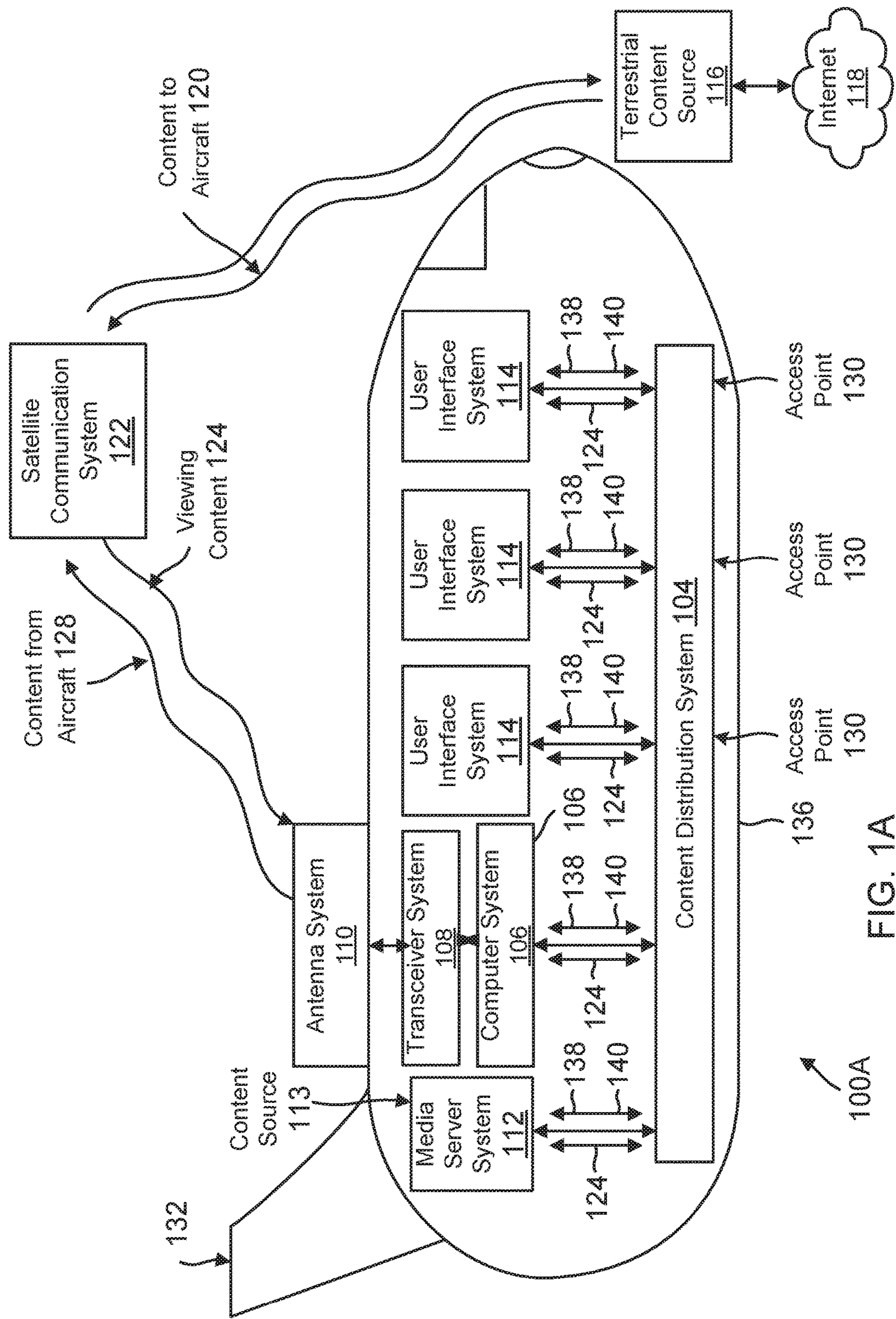
FIG. 1A shows an example of an operating environment for implementing the various aspects of the present disclosure on an aircraft.

Vehicle Information System: FIG. 1A shows an example of a generic vehicle information system 100A (also referred to as system 100A) that can be configured for installation aboard an aircraft 132 for automatically pairing a PED at the aircraft 132, according to one aspect of the present disclosure. When installed on an aircraft, system 100A can comprise an aircraft passenger IFE system, such as the Series 2000, 3000, eFX, eX2, eXW, and/or any other inflight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive content 120 from the terrestrial content source 116 and provide the content 120, as processed by the transceiver system 108, to a computer system 106 of system 100A. The computer system 106 can provide the received content 120 to the media (or content) server system 112 and/or directly to one or more of the user interfaces 114 including a PED as viewing content 124, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system. In at least one embodiment, the user interface system 114 comprises a software application that a user downloads and installs on a PED to receive and view content via an access point 130. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, a Wi-Fi connection or for any other reason, payment information likewise can be entered via the input system. The input system can be provided in any conventional manner and typically includes a touch screen, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircrafts and seating arrangements and the adaptive aspects described herein are not limited to any specific seat arrangements or user interface types.

Figure 1B:
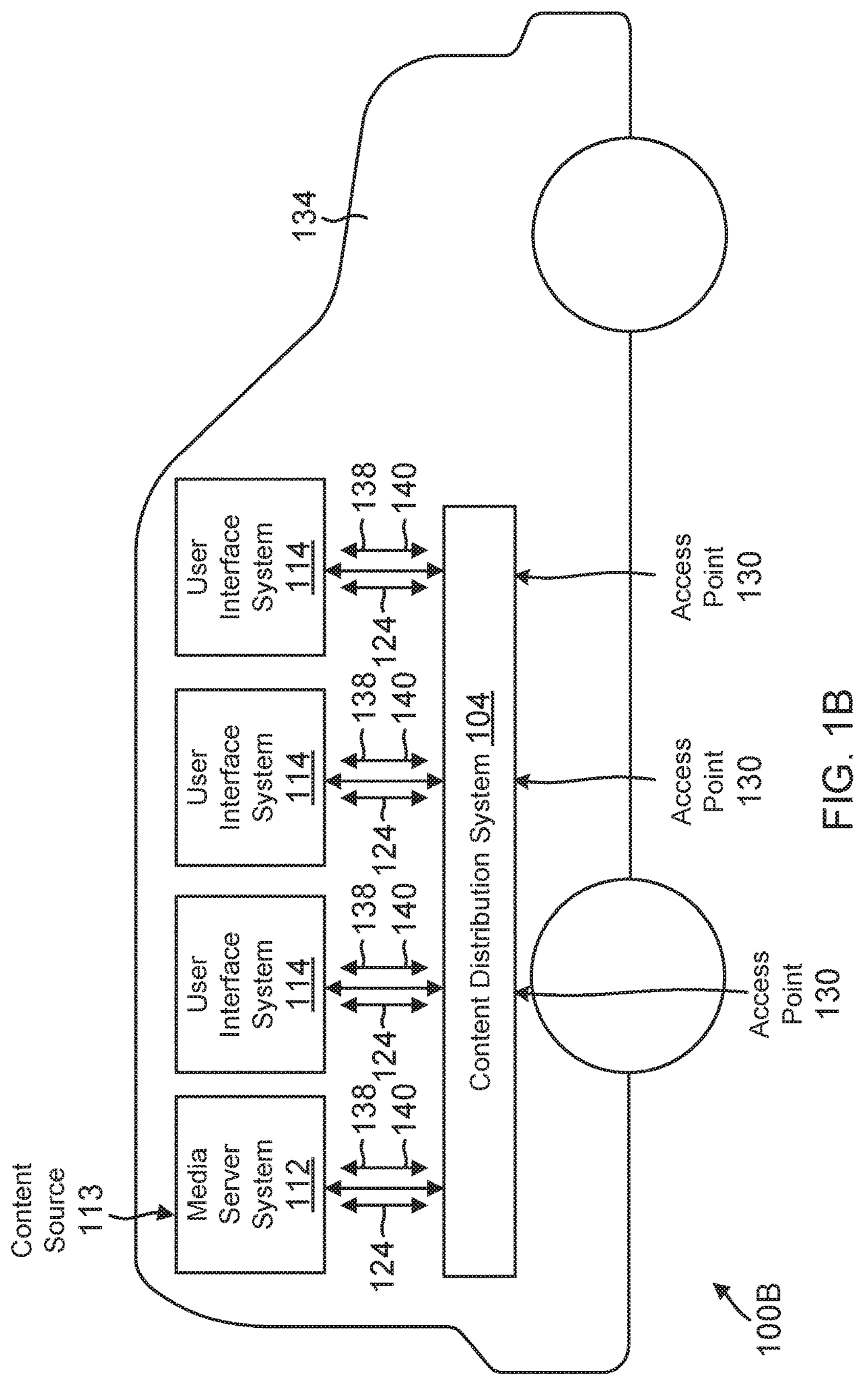
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
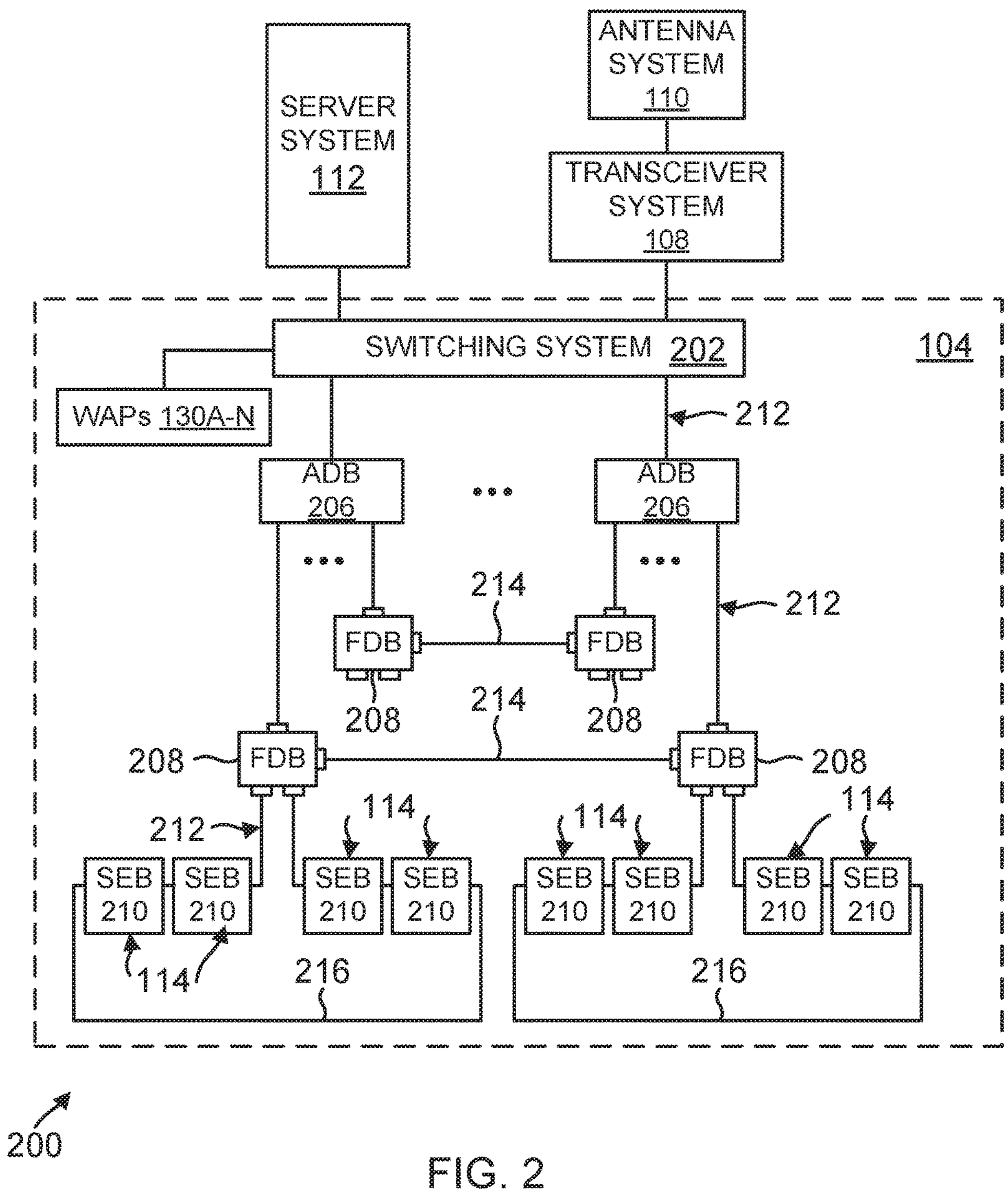
FIG. 2 shows an example of a content distribution system, used according to one aspect of the present disclosure.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3:
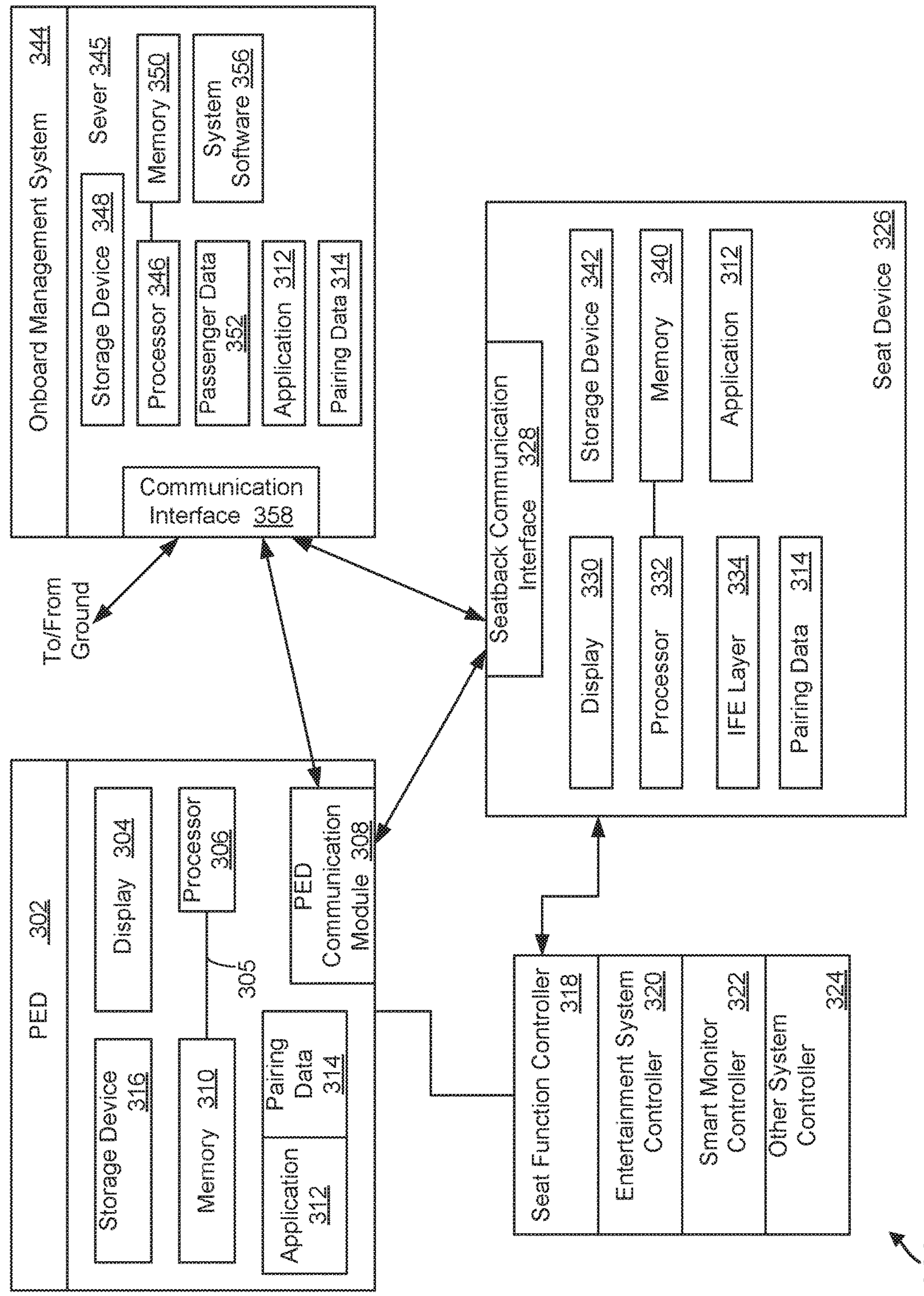
FIG. 3 shows an example of a system for automatically pairing a personal electronic device (PED) on a transportation vehicle, according to one aspect of the present disclosure.

Pairing System: FIG. 3 shows an example of a system 300 that may be used to automatically pair a PED 302 with a seat device (may also be referred to as seatback device) 326 and/or an onboard management system 344, in one aspect of the present disclosure. The onboard management system 344 may be similar to computer system 106 and/or server 112 described above with respect to FIGS. 1A/1B. The seat device 326 may be part of the user interface system 114 or interfaces with the user interface system 114 described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, the PED 302 maybe a mobile phone, a notebook, a tablet, a laptop or any other similar device. PED 302 may include a processor 306 that has access to a memory 310 via an interconnect/bus 305 for executing stored instructions. Processor 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The bus system 305 is an abstraction that represents any one or more separate physical buses and/or point-to-point connections, connected by appropriate bridges, adapters and/or controllers. The bus system 305, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The PED 302 includes a storage device 316 that may be, or may include any storage medium for storing data in a non-volatile manner, such as one or more magnetic or optical based disks, flash memory, or solid-state drive. The storage device 316 maybe used to store content displayed on a display 304 of PED 302. In one aspect, display 304 may include a touch screen for receiving input commands.

The storage device 316 may also store an application (maybe referred to as companion application or pairing application) 312 and executed out of memory 310. In one aspect, application 312 enables the PED 302 to automatically pair with a transportation vehicle system in general and to the seat device 326 in particular, i.e., pair with minimal passenger involvement.

PED 302 may also store pairing data 314 that includes pairing information for securely pairing the PED 302 with the seat device 326. In one aspect, the pairing data 314 includes PED 302 identification information, configuration information that is used to pair the PED 302 including a seat identifier.

In one aspect, application 312 may be stored on a non-transitory storage medium, such as a hard drive, CD, CD-ROM, DVD, flash memory, or any other storage device (volatile or non-volatile), etc. For example, application 312 may be stored on a storage device of an application store ("App Store") (not shown) such as that operated by Apple, Inc. under the trademark ITUNES, the application store operated by Google, Inc. under the trademark GOOGLE PLAY, or the application store operated by Microsoft Corporation under the trademark WINDOWS STORE. Alternatively, the app store may be a website server for a website operated by a provider of the on-board management system 344 such as the manufacturer or a carrier operating the vehicle (e.g., a commercial airline, train operator, cruise line, bus line, etc.).

It is noteworthy that application 312 may be executed in part by seat device 326 and/or the onboard management system 344 to assist in PED pairing with minimal user interaction, as described below in detail. The adaptive aspects described herein are not limited to any specific location for executing application 312.

The term "pair", and other grammatical forms such as "pairing", means that the PED 302 is associated with a particular passenger seat such that communications received by seat device 326 from the PED 302 are recognized as being related to that passenger seat and/or such communications control seat functions associated with the particular passenger seat and controlled by a seat function controller 318. The term automatic as associated with pairing means that the PED is paired with minimal passenger involvement, as described below in detail.

In one aspect, the seat function controller 318 provides a controller 320 to control the entertainment system for accessing audio/video content, a controller 322 for controlling a smart monitor (that is part of or interfaces with the seat device 326). Other system controller 324 may include a controller for controlling the lighting system for controlling lights for a passenger seat, e.g., a reading light, a controller for an attendant call system to call an attendant, a controller for a telephone system, a controller for food service to order food, a controller for making seat adjustments and others. The various aspects disclosed herein are not limited to any particular type of seat function.

In one aspect, the seat function controller 318 communicates with the PED communication module 308 that includes one or more interfaces to communicate with different devices, including a Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module 308 may have different interface, cards, logic and circuitry to comply with the different communication protocols/standards.

In one aspect, the seat device 326 includes a display device or simply "display" 330, a processor 332, a memory 340, a communication interface 328 and a local storage device 342 for storing content. The seat device 326 receives user input/requests via an input module (not shown). The input module may be configured to use a local touch screen at display 330, a local virtual keyboard, an external mouse, external keyboard or any other input device. The various adaptive aspects described herein are not limited to any specific input device.

Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

In one aspect, processor 336 executes an IFE layer 334 that provides inflight entertainment and other options to users. The IFE layer 334 uses the communication interface 328 to interface with the PED 302 and/or onboard management system 344. The IFE layer 334 provides audio/video content as well as controls for accessing the content.

In one aspect, the seat device 326 also stores pairing data 314 and may include details of PED 302, for example, a PED identifier, a seat identifier or any other PED data that can be used for authenticating a PED device for a pairing request.

In one aspect, the onboard management system 344 includes a server 345 (similar to media server 112 and/or computer system 106). The server 345 includes a processor 346 that has access to a memory 350 via a bus system, similar to bus 305 described above in detail. Processor 346 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data, applications and program files. In one aspect, the onboard management system 344 maintains passenger data 352 (may also be referred to as passenger manifest data 352) that identifies each passenger for a flight, a seat assigned to a passenger and any other information that can uniquely identify the passenger. The passenger data 352 may be populated from an electronic boarding pass that is used by a passenger and/or from the carrier operating the aircraft. The information from passenger data 352 maybe provided to seat device 326 for validating passenger information.

System software 356 of the onboard management system 344 is executed by the processor 346 to control the overall operation of the server 345. In one aspect, the server system 345 may also store the pairing data 314 described above.

In one aspect, server 345 communicates with PED 302 and/or seat device 326 via a communication interface 358. The communication interface 358 may also be used to receive information from the ground. The communication interface 358 includes one or more interfaces for a wired and/or wireless connection, as described above with respect to FIGS. 1A/1B and 2.

Figure 4A:
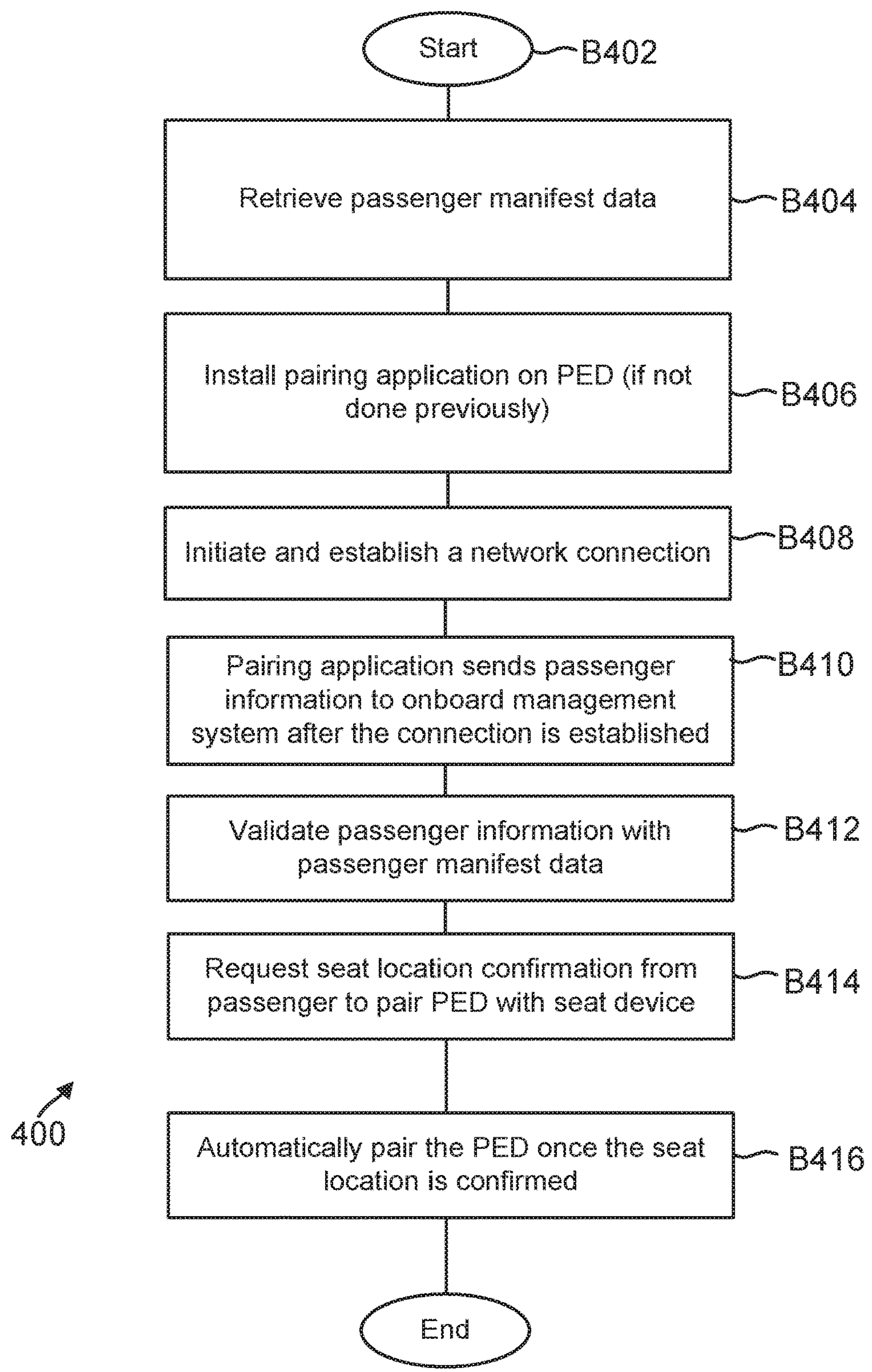
FIGS. 4A-4B shows process flows for pairing a PED, according to one aspect of the present disclosure.

Process Flow: FIG. 4A shows a process 400 for automatically pairing the PED 302, according to one aspect of the present disclosure. The process begins in block B402, when PED 302 is operational and initialized. Seat device 326 and the onboard management system 344 are also operational and initialized.

In block B404, the passenger data 352 is retrieved and provided to server 345. This data includes passenger name, seat identifier, frequent flier information, if available, and any other data that can be used to identify the passenger. The passenger information may be provided to server 345 by the airline operating an aircraft, a ground server or by any other computing entity. The passenger data 352 may be stored at a storage device that can be retrieved by processor 346.

In block B406, if not done previously, application 312 is downloaded to the PED 302. In this regard, block B406 is preferably performed prior to a flight. Notwithstanding, the application 312 may be made available for download from the onboard management system 344 of a vehicle for the convenience of passengers who did not download and install the application earlier. Notwithstanding, downloading from the onboard management system 344 may not be compatible with the particular operating system of the PED 302 as some PED operating systems allow download and installation of applications only from a specific download site. If the onboard management system 344 has connectivity with the Internet 118, the onboard management system 344 may permit a PED 302 to connect to the foregoing specific download site as required by the PED's operating system for downloading and installation of the application 312.

When application 312 is downloaded it may request a passenger's name and other identifying information. This information is stored in memory 310 and/or storage device 316 of the PED. Alternatively, after the application 312 is downloaded, installed, and opened/launched for the first time on the PED 302, the application requests entry of the passenger's name and other identifying information and stores the information in memory 301 and/or storage device 316.

In block B408, the PED 302 may initiate a network connection, for example, a Wi-Fi connection. When the connection is requested, terms and conditions may be displayed at display 304 of the PED and/or display 330 of the seat device 326. Once the connection is established, application 312 sends passenger identifying information to server 345. In another aspect, the passenger information is sent to seat device 326 that may provide the information to the server 345.

In block B412, server 345 verifies if the passenger identification information is accurate. In one aspect, application 312 (or a portion thereof) may use passenger data 352 to validate the passenger information.

Upon successful validation in block B412, the passenger is requested to verify their seat location in block B414. Seat location is generally verified by the passenger supplying a seat number. Seat number as used herein is defined to include an alphanumeric string of characters identifying a seat on the vehicle, with the numerical portion typically defining a row of seats on the vehicle, and a letter following the numerical portion identifying a seat in the foregoing row.

Seat location verification may be implemented by displaying a request to the passenger at seat device 326 and/or PED 302 to enter the seat number, or display the seat number and ask the passenger to select yes or no for confirmation. If the request for verification is shown on the display of a seat device 326, the request is shown for a predefined period of time, e.g., thirty seconds, and if no request is received, a request may thereafter be sent to the PED 302 for the passenger to enter the seat number. This helps to prevent a passenger from verifying an incorrect seat number if the passenger has changed seats relative to the seat information in the passenger manifest. For a passenger that has changed seats, the system may require a crew member to authorize associating the PED 302 with the seat device 326 at the new seat.

Once the passenger seat number is confirmed, PED 302 is paired with the seat device 326. This enables the PED 302 to operate as a remote controller to access seat function controller 318 for managing one or more seat functions, as described above with respect to FIG. 3.

Figure 4B:
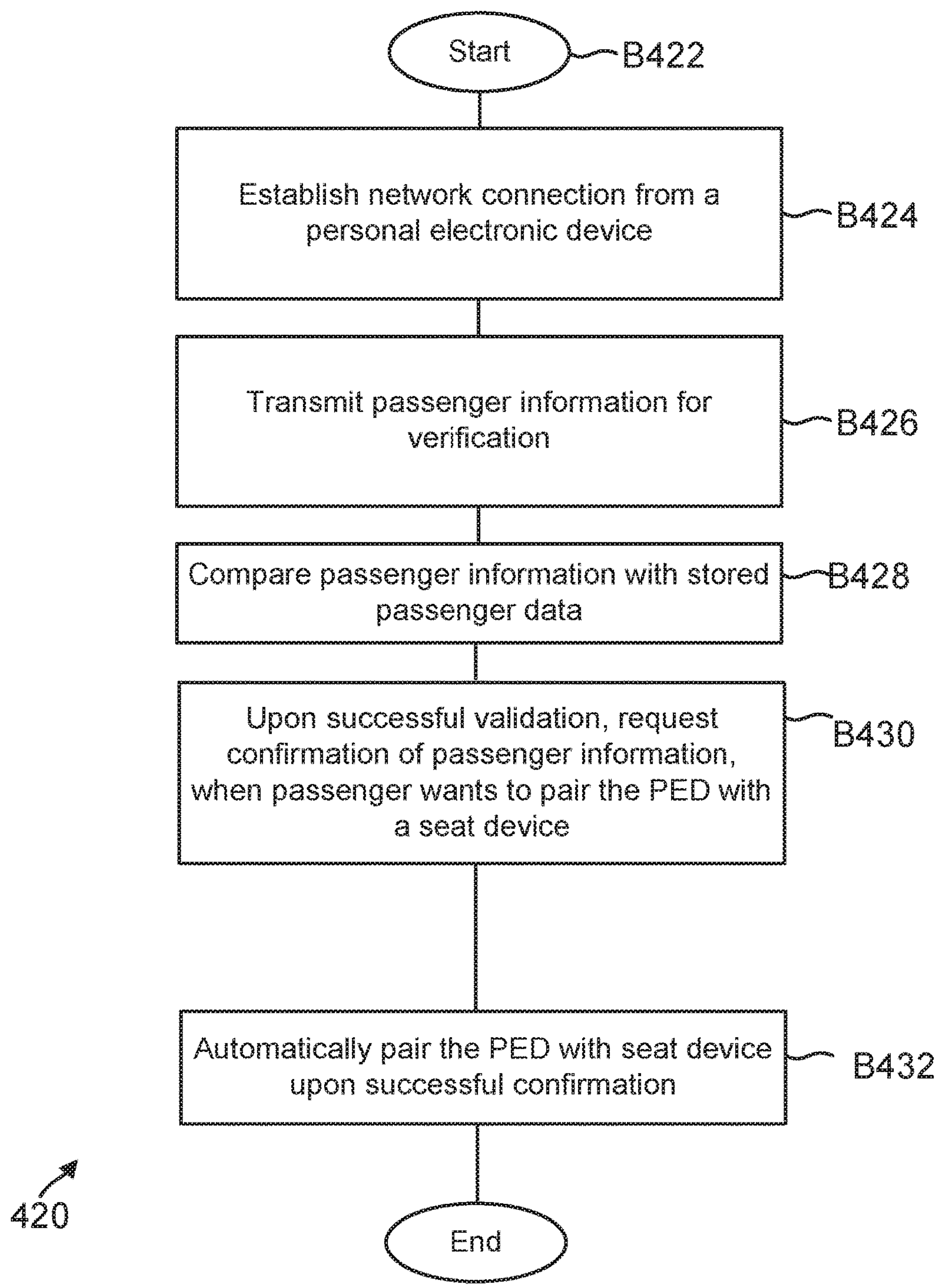

FIG. 4B shows another process 420 for pairing PED 302 with seat device 326, according to one aspect of the present disclosure. The process begins in block B402, when PED 302 is operational and initialized. Seat device 326 and the onboard management system 344 are also operational and initialized.

In block B424, PED 302 initiates and establishes a network connection, for example, a Wi-Fi or any other network connection type. In block B426, application 312 transmits passenger information to an aircraft system, for example, seat device 326 and/or server 345 as a background process.

In block B428, passenger information is compared with stored passenger data 352. This may be verified by the server 345 or the seat device 326 that may obtain a copy of the passenger data 352 and store it securely in storage device 342.

In block B430, upon successful validation of passenger identity, the aircraft system requests confirmation of certain passenger information, for example, the seat number or any other information type. This may be executed by the seat device 326 directly or by the server 345. The passenger may confirm the information by providing an input via PED 302 and/or the seat device 326. Once the information is confirmed, in block B432, the PED 302 is paired to the aircraft system. This enables the PED 302 to manage various function including the functions provided by the seat function controller 318.

Figure 5:
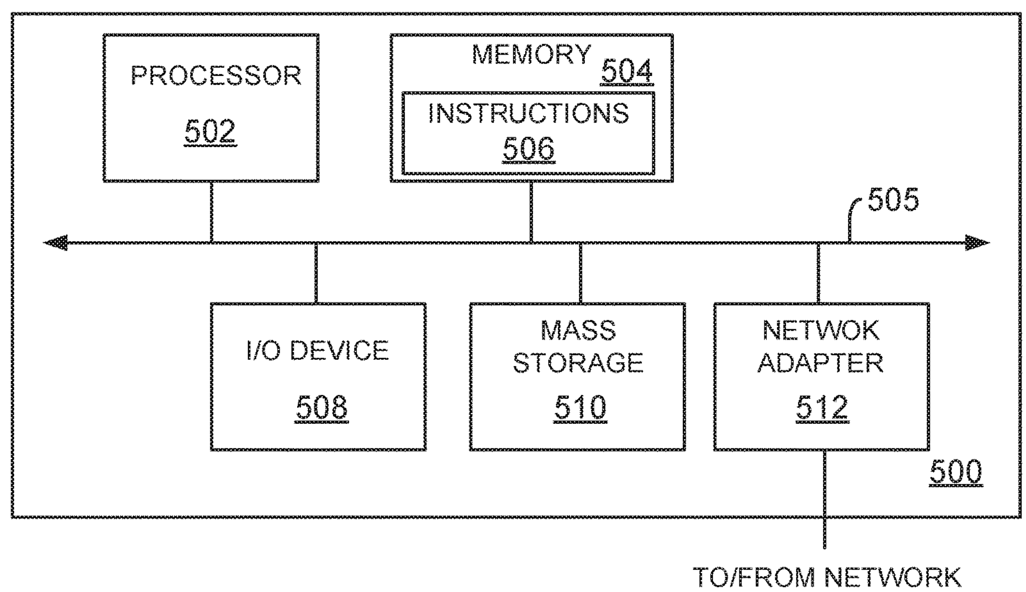
FIG. 5 shows a block diagram of a computing system, used according to one aspect of the present disclosure.

The various aspects disclosed herein have advantages over conventional systems. A PED can be paired automatically via a network connection on the aircraft using an application operating in the background. The pairing operation is seamless and transparent to the passengers Processing System: FIG. 5 is a high-level block diagram showing an example of the architecture of a processing system 500 that may be used according to one aspect. The processing system 500 can represent media server 112, computing system 106, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIGS. 4A-4C described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for automatically pairing PEDs have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:

accepting a wireless network connection from an electronic device to a network of an aircraft;

receiving passenger information from the electronic device by an onboard management system of the aircraft;

verifying passenger information against a passenger manifest data stored by the onboard management system;

upon successful verification of passenger information, displaying a request for confirmation of a passenger seat location on a seat device for a certain duration; wherein the passenger seat location is based on a seat identifier identifying a specific seat;

sending the request to the electronic device for confirmation of the passenger seat location, when a response to the request is not received from the seat device after the certain duration; and after successful confirmation of the passenger seat location either from the seat device when the request is presented for the certain duration or the electronic device, when the response to the request is not received during the certain duration, accepting communications from the electronic device by the onboard management system for controlling one or more functions associated with the seat; wherein the electronic device is paired with the seat device and operates as a remote control for controlling an attribute of an inflight entertainment system of the aircraft.

2. The method of claim 1, wherein the seat identifier includes a numeric portion to identify a row of seats and a letter portion identifying the seat within the row.

3. The method of claim 2, wherein the one or more functions are of the seat device interfacing with the onboard management system via a wired network connection.

4. The method of claim 1, wherein the onboard management system includes the inflight entertainment system comprising a plurality of seat devices.

5. The method of claim 1, wherein the electronic device operates as a remote control for controlling another feature available at the seat, including at least one of activating a reading light and activating a flight attendant call light.

6. A system for a transportation vehicle for use with a passenger having a personal electronic device, the system comprising:

a network and a computing device in communication with the network, the computing device including a memory containing a machine readable medium storing passenger manifest data and machine executable code, and a processor module coupled to the memory in which the processor module is configured to execute the machine executable code to:

accept a request from the personal electronic device for connection to the network;

receive passenger information from the personal electronic device after the request is accepted;

verify the passenger information against the passenger manifest data;

upon successful verification of the passenger information, display a request for confirmation of a passenger seat location on a seat device for a certain duration; wherein the passenger seat location is determined by a seat identifier identifying a specific seat;

communicate the request for confirmation of the passenger seat location to the personal electronic device when a response to the request is not received from the seat device after the certain duration; and after successful confirmation of the passenger seat location either from the seat device, when the request is displayed for the certain duration or the electronic device, when the response to the request is not received during the certain duration, accepting communications from the personal electronic device for controlling one or more functions associated with the seat;

wherein the transportation vehicle is one of an aircraft, a train, a bus, a ship and a recreation vehicle;

wherein the personal electronic device is paired with the seat device and operates as a remote control for controlling an attribute of an inflight entertainment system, when the transportation vehicle is the aircraft.

7. The system of claim 6, wherein the connection is a wireless connection to the network.

8. The system of claim 6, wherein the passenger information identifies a passenger for associating the personal electronic device with the seat device comprising at least a portion of the inflight entertainment system.

9. The system of claim 6, wherein the transportation vehicle computing device comprises an onboard management system.

10. The system of claim 6, wherein the seat device and personal electronic device each include a display, and the request for confirmation of the passenger seat location is shown on one of the display of the seat device and the personal electronic device.

11. The system of claim 6, wherein the computing device comprises a server of the inflight entertainment system.

12. The system of claim 6, wherein the personal electronic device is paired with the seat device and operates as a remote control for controlling another feature available at the seat, including at least one of activating a reading light and activating a flight attendant call light, when the transportation vehicle is the aircraft.

13. The system of claim 9, wherein the seat identifier includes a numeric portion to identify a row of seats and a letter portion identifying the seat within the row.

14. The system of claim 6, wherein the one or more functions are of the seat device interfacing with the onboard management system via a wired network connection.

15. A non-transitory machine-readable medium having stored thereon instructions for performing a method comprising machine executable code which when executed by at least one machine, causes the machine to:

accept a wireless network connection from an electronic device to a network of an aircraft;

receive passenger information from the electronic device by an onboard management system of the aircraft;

verify passenger information against a passenger manifest data stored by the onboard management system;

upon successful verification of passenger information, display a request for confirmation of a passenger seat location on a seat device for a certain duration; wherein the passenger seat location is determined by a seat identifier identifying a specific seat;

sending the request to the electronic device for confirmation of the passenger seat location, when a response to the request is not received from the seat device after the certain duration; and after successful confirmation of the passenger seat location either from the seat device when the request is presented for the certain duration or the electronic device, when the response to the request is not received during the certain, accept communications from the electronic device by the onboard management system for controlling one or more functions associated with the seat; wherein the electronic device is paired with the seat device and operates as a remote control for controlling an attribute of an inflight entertainment system of the aircraft.

16. The storage medium of claim 15, wherein the seat identifier includes a numeric portion to identify a row of seats and a letter portion identifying the seat within the row.

17. The storage medium of claim 16, wherein the one or more functions are of the seat device interfacing with the onboard management system via a wired network connection.

18. The storage medium of claim 15, wherein the onboard management system includes the inflight entertainment system comprising a plurality of seat devices.

19. The storage medium of claim 15, wherein the electronic device operates as a remote control for controlling another feature available at the seat, including at least one of activating a reading light and activating a flight attendant call light.

20. The storage medium of claim 18, wherein the seat device and the electronic device each include a display, and the request for confirmation of a passenger seat location is shown on one of the display of the seat device and the electronic device.

* * * * *